S. W. Wood.
Revolving Rake.

N° 17772   Patented Jul. 7, 1857.

United States Patent Office.

S. W. WOOD, OF WASHINGTON, DISTRICT OF COLUMBIA, ASSIGNOR TO LEWIS H. PARSONS.

IMPROVEMENT IN HAY-RAKES.

Specification forming part of Letters Patent No. 17,772, dated July 7, 1857.

*To all whom it may concern:*

Be it known that I, S. W. WOOD, of the city of Washington, and District of Columbia, have invented certain new and useful Improvements in Hay-Rakes, of which the following is a full, clear, and exact description, reference being had to the annexed drawings, making part of this specification.

Figure 1:
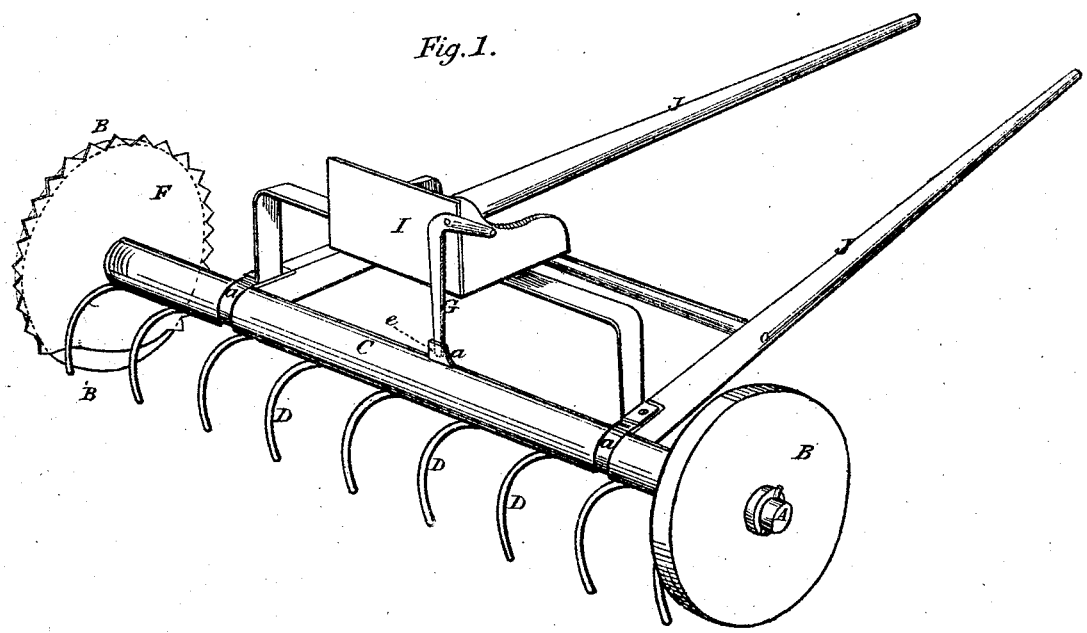
Figure 2:
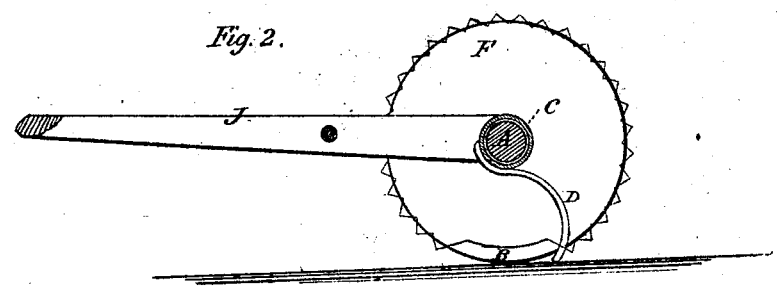

Figure 1 represents a view in perspective. Fig. 2 is a vertical cross-section.

My invention consists in constructing a hay-rake of a loose revolving tube placed upon an axle, to which tube are secured rake-teeth in any convenient manner, and of any desired form.

Like letters indicate similar parts in all the figures.

To enable others skilled in the art to make and use my improved hay-rake, I will proceed to describe the same in detail.

A in the annexed drawings represents an axle provided with wheels B. Upon this axle is placed a tube, C, fitting loosely, to which are secured rake-teeth D of any desired form and material. To one end of this tube C is secured a segment of a toothed or notched wheel, F, for the purpose of revolving said tube, to which the teeth D are attached at the proper period (by taking into the earth) to free the teeth and leave the gathered hay in windrows. The lower side of the toothed wheel F when in position for raking, as shown in the accompanying drawings, is beveled off somewhat smaller than the wheel B, so as to pass over the earth without coming in contact. The tube C, to which the teeth D are secured, is retained in position when raking by a lug or projection, *a*, secured thereto, which is brought in contact with the lower end of a bell-crank, G, secured to the driver's seat I.

J represents the shafts by which the rake is drawn, being secured to the revolving tube by straps *u*, or in any other convenient manner. Upon these shafts is mounted the driver's seat I, sufficiently high to permit the teeth D to revolve beneath it without coming into contact. To the back of this seat is attached the bell-crank G, which is operated at the desired moment by the hand of the driver to free the tube *c* and permit it to revolve once. This bell-crank is balanced, so that when the operator removes his hand it assumes a perpendicular position to be in readiness to arrest the rake after having made its revolution by its lower end, *e*, coming in contact with the lug or projection *a*.

The rake is retained in position by the bell-crank G, or in any other convenient manner, until a sufficient quantity of hay is gathered. When the tube is released the toothed wheel F takes into the earth, revolves the rake, and, leaving the gathered hay in windrow, presents the rake in position for a repetition.

The notched wheel F may be keyed (instead of being irremovably secured) to the end of the tube *c*, so that when necessary to remove the rake to different localities the toothed wheel F may be loosened and the rake-teeth turned up, so as not to come in contact with the earth.

Having thus fully described my improved hay-rake, what I claim therein as new, and desire to secure by Letters Patent, is—

A hay-rake consisting of a loose revolving tube, *c*, in combination with a segment-wheel, F, placed upon an axle, A, said tube being provided with teeth D of any desired form or material, the whole arranged and operating in the manner substantially as described.

S. W. WOOD.

Witnesses:
 J. S. BROWN,
 R. F. OSGOOD.